United States Patent [19]

Wilson

[11] 3,933,721

[45] Jan. 20, 1976

[54] FLAME RETARDANT PLASTICIZED COMPOSITIONS

[75] Inventor: Alfred P. Wilson, St. Charles, Ill.

[73] Assignee: Standard Oil Company, Chicago, Ill.

[22] Filed: Oct. 23, 1973

[21] Appl. No.: 408,804

[52] U.S. Cl. 260/31.8 HA; 260/45.85 T; 260/475 R; 260/31.8 W
[51] Int. Cl.² .......... C07C 69/82; C08K 5/12; C08L 27/08
[58] Field of Search... 260/475 R, 31.8 HA, 45.85 T, 260/31.8 W; 106/15 FP

[56] References Cited
UNITED STATES PATENTS

| | | | |
|---|---|---|---|
| 2,398,882 | 4/1946 | Clark | 260/475 |
| 2,460,574 | 2/1949 | Gresham | 260/31.8 HA |
| 3,388,137 | 6/1968 | Schmerling | 106/15 FP |

*Primary Examiner*—Allan Lieberman
*Attorney, Agent, or Firm*—William H. Magidson

[57] ABSTRACT

Resinous polymers of vinyl chloride plasticized with 2,5-dibromoterephthalate esters.

7 Claims, No Drawings

FLAME RETARDANT PLASTICIZED COMPOSITIONS

This invention relates to the plasticization of resinous polymers of vinyl chloride with 2,5-dibromoterephthalate esters.

It is generally accepted that unplasticized homopolymers of vinyl chloride are fire retardant. However, it is conventional to employ copolymers containing various comonomers, such as vinyl acetate, and/or various plasticizers to impart desirable properties to the polymer. Unfortunately, these modifications result in loss of fire retardancy.

The general object of this invention is to provide fire retardant plasticized resinous polymers of vinyl chloride. Other objects appear hereinafter.

I have now found that dialkyl esters of 2,5-dibromoterephthalic acid are excellent plasticizers for resinous polymers of vinyl chloride. These esters can be used in plasticizing concentrations without exudation from the resinous polymers of vinyl chloride. Accordingly, these esters are effective as plasticizers and do not reduce the fire retardancy of the resinous polymers of vinyl chloride. Further, the high bromine content of these plasticizers enhances the fire retardancy of these compositions.

For the purpose of this invention, the term "resinous polymer of vinyl chloride" includes homopolymers of vinyl chloride, copolymers of vinyl chloride and vinyl acetate, such as the conventional 95-5 vinyl chloride/-vinyl acetate copolymers, partially hydrolyzed vinyl chloride/vinyl acetate copolymers, vinyl acetate/vinyl chloride/alpha, beta-ethylenically unsaturated-alpha, beta-dicarboxylic acid copolymers (such as the butyl half ester of maleic acid or dioctyl fumarate ester, etc.), etc., wherein at least 50 mol percent of the polymer constitutes vinyl chloride units.

The 2,5-dibromoterephthalate esters of this invention can be used in a concentration of from about 5 to 300 parts by weight per 100 parts by weight resinous polymer of vinyl chloride, i.e., in a plasticizing concentration. These plasticizers may be used as the sole plasticizers, two or more esters of 2,5-dibromoterephthalic acid may be employed together or alternatively, these esters may be used in conjunction with other conventional plasticizers such as dioctyl phthalate, trioctyl phosphate, epoxidized glyceride oils, etc.

The dialkyl esters of 2,5-dibromoterephthalic acid of this invention can contain from 4 to 24 carbon atoms in each alkyl group, preferably 6 to 13 carbon atoms. The alkyl groups can be primary or secondary and the same or different. Suitable esters include di-n-butyl, 2,5-dibromoterepthalate, di-n-hexyl 2,5-dibromoterephthalate, di-n-octyl, 2,5-dibromoterephthalate, di(2-ethylhexyl) 2,5-dibromoterephthalate, di-(decyl) 2,5-dibromoterephthalate, di-tridecyl 2,5-dibromoterephthalate, distearyl 2,5-dibromoterephthalate, di-tetracosyl, 2,5-dibromoterephthalate, butyl, 2-ethylhexyl 2,5-dibromoterephthalate, etc.

In general, the dioctyl and di-2-ethylhexyl esters are particularly preferred since they provide optimum plasticization and overall balance of desirable properties at the highest concentration of bromine per unit weight of plasticizer. Other things being equal, plasticizer efficiency and volatility are maximum when there are 4 carbon atoms in the alkyl groups, and drop off as the number of carbon atoms increases. The dioctyl esters (normal and 2-ethylhexyl) have the best balance of plasticizer properties. The low boiling points of the dibutyl and diamyl esters tend to reduce the fire retardancy of these esters, since these esters are volatilized below the ignition temperature of polyvinyl chloride.

The esters can be produced by reacting 2,5-dibromoterephthalic acid with at least 2 mols of the appropriate monohydric alcohol per mol of acid at from 105° to 225° C. While esterification is relatively smooth at 170° C. or above in the absence of catalyst, the reaction can be speeded up or carried out at a lower temperature using a conventional esterification catalyst, such as paratoluenesulfonic acid, benzene sulfonic acid, sulfuric acid, etc. If desired, 2,5-dibromoterephthalolyl halide (chloride or bromide) can be reacted with monohydric alcohol at still lower temperatures.

The plasticized resinous polymers of vinyl chloride can be compounded with stabilizers, such as the organo tins, barium/cadmium soaps, polyhydric alcohols, etc.; lubricants, such as fatty acids; pigments, such as zinc oxide, antimony oxide, etc. and fabricated by conventional means into films, sheets, fibers, tubes, etc.

The following examples are merely illustrative.

EXAMPLE 1

Two hundred and fifty grams 2,5-dibromoterephthalic acid (.77 mols) was added to 125.8 grams butyl alcohol (1.69 mols) and 39 grams xylene in a 2-liter, three-neck flask equipped with a heating mantel, stirrer, thermometer, nitrogen sparge tube and a reflux condenser equipped with a water trap. After the flask was heated to 50° C., 5 grams paratoluenesulfonic acid was added. The solution was then heated to 155° C. for 7 hours to produce an ester having an acid number of less than 3. After the xylene was distilled off from the reaction vessel, the crude ester was filtered off, washed 3 times with 70° C. distilled water. The ester was oven dried at 120° C. to remove any residual water and xylene yielding a product melting at 55° C.

Essentially the same technique was used to prepare the n-dioctyl ester and the di-2 ethylhexyl esters by using the same molar concentration of the appropriate alcohol in place of butyl alcohol.

EXAMPLE 2

Plasticized compositions were prepared by blending 100 parts by weight polyvinyl chloride (Geon 102 EP), 60 parts by weight plasticizer, 1.5 parts by weight barium/cadmium soap stabilizer (Mark W S) and 0.4 parts by weight of stearic acid lubricant. The compositions were milled and formed into 10 mol sheets. The results are set forth below in Table I.

TABLE I

| Plasticizer | *Parts By Weight | Tensile Strength | 100% Modul. | % Elongation | Flammability |
|---|---|---|---|---|---|
| n-Dibutyl DBTA ) | 10 | 2740 | 1008 | 437 | Burns |
| Dioctyl Phthalate ) | 50 | | | | |
| n-Dibutyl DBTA ) | 20 | NOT DETERMINED | — | | Burns |

TABLE I-continued

| Plasticizer | Parts By Weight | Tensile Strength | 100% Modul. | % Elongation | Flammability |
|---|---|---|---|---|---|
| Dioctyl Phthalate | ) 40 | | | | |
| n-Dibutyl DBTA | ) 30 | 2650 | 1075 | 415 | Self-Extinguishing |
| Dioctyl Phthalate | ) 30 | | | | |
| n-Dioctyl DBTA | ) 60 | 3420 | 2000 | 240 | Self-Extinguishing |
| D2EH DBTA | ) 5 | 3093 | 1480 | 350 | Self-Extinguishing |
| Dioctyl Phthalate | ) 55 | | | | |
| D2EH DBTA | ) 10 | 2960 | 1525 | 320 | Self-Extinguishing |
| Dioctyl Phthalate | ) 50 | | | | |
| D2EH DBTA | ) 15 | 2750 | 1640 | 300 | Self-Extinguishing |
| Dioctyl Phthalate | ) 45 | | | | |

In the above Table, DBTA stands for dibromoterephthalate and D2EH stands for di-2-ethylhexyl.

The above Table clearly illustrates that dibromoterephthalic acid esters are suitable plasticizers for resinous polymers of vinyl chloride and are efficient in reducing the flammability of plasticized polymers using plasticizers such as dioctyl phthalate.

Although this invention is primarily directed to fire retardant resinous polymers of vinyl chloride, the 2,5-dibromoterephthalate plasticizers can be employed as additives to impart fire retardant properties to various flammable polymers, particularly thermoplastic addition polymers. Suitable thermoplastic addition polymers include homopolymers, copolymers, block copolymers, etc., of olefins, such as ethylene, propylene, styrene, vinyl toluene; methyl methacrylate; ethyl acrylate; vinyl bromide; acrylonitrile; butadiene; vinyl acetate; etc. The 2,5-dibromoterephthalate esters can comprise from 5 to 300 parts by weight per 100 parts by weight flammable polymer. The concentration of 2,5-dibromoterephthalate should be adjusted to provide the desired degree of fire retardancy.

We claim:

1. A composition comprising a resinous polymer of vinyl chloride, wherein at least 50 mol percent of the polymer contains vinyl chloride units, and a plasticizing concentration of a dialkyl 2,5-dibromoterephthalate ester containing from 4 to 24 carbon atoms in each alkyl group.
2. The composition of claim 1, wherein said 2,5-dibromoterephthalate ester comprises a dialkyl ester containing from 6 to 13 carbon atoms in each alkyl groups.
3. The composition of claim 2, wherein said resinous polymer of vinyl chloride is a homopolymer.
4. The composition of claim 2 wherein said 2,5-dibromoterephthalate ester is present in a concentration of from about 5 to 300 parts by weight per 100 parts by weight resinous polymer of vinyl chloride.
5. The composition of claim 4, wherein said 2,5-dibromoterephthalate is an octyl ester.
6. The composition of claim 5, wherein said octyl ester is a normal ester.
7. The composition of claim 5 wherein said octyl ester is a di-(2 ethyl hexyl) ester.

* * * * *